US012528340B2

(12) United States Patent
Schumacher

(10) Patent No.: US 12,528,340 B2
(45) Date of Patent: Jan. 20, 2026

(54) VEHICLE ROOF HAVING AN OPENABLE FOLDING ROOF WITH A TENSIONING CABLE SYSTEM

(71) Applicant: Magna Car Top Systems GmbH, Bietigheim-Bissingen (DE)

(72) Inventor: Thorsten Schumacher, Kummerfeld (DE)

(73) Assignee: Magna Car Top Systems GmbH, Bietigheim-Bissingen (DE)

(*) Notice: Subject to any disclaimer, the term of this patent is extended or adjusted under 35 U.S.C. 154(b) by 350 days.

(21) Appl. No.: 18/492,888

(22) Filed: Oct. 24, 2023

(65) Prior Publication Data
US 2024/0131909 A1 Apr. 25, 2024
US 2024/0227523 A9 Jul. 11, 2024

(30) Foreign Application Priority Data

Oct. 25, 2022 (DE) .......................... 102022211317.9

(51) Int. Cl.
*B60J 7/12* (2006.01)
*B60J 7/06* (2006.01)

(52) U.S. Cl.
CPC ................. *B60J 7/12* (2013.01); *B60J 7/061* (2013.01); *B60J 7/1204* (2013.01); *B60J 7/1291* (2013.01)

(58) Field of Classification Search
CPC ... B60J 7/12; B60J 7/1291; B60J 7/061; B60J 7/1204
USPC ....................................................... 296/219
See application file for complete search history.

(56) References Cited

U.S. PATENT DOCUMENTS

| 3,625,084 A | * | 12/1971 | Low | ........................... F16C 1/00 |
| | | | | 248/278.1 |
| 11,560,201 B2 | * | 1/2023 | Eveleigh | ................ B62M 9/126 |

FOREIGN PATENT DOCUMENTS

| DE | 3723598 C2 | * | 11/1992 | .............. B60J 7/064 |
| DE | 19943771 C1 | | 2/2001 | |
| DE | 10061562 A1 | | 6/2002 | |
| DE | 102011113888 A1 | * | 3/2013 | .............. B60J 7/064 |
| EP | 2572913 B1 | | 8/2017 | |

(Continued)

OTHER PUBLICATIONS

DE102011113888 Text (Year: 2013).*
DE3723598 Text (Year: 1992).*
EP4129106 Text (Year: 2023).*

*Primary Examiner* — Dennis H Pedder
(74) *Attorney, Agent, or Firm* — Dickinson Wright PLLC

(57) ABSTRACT

A vehicle roof including an openable folding roof and a tensioning cable which tensions the folding roof in the closed state. One front end of the cable is fixedly anchored to a front roof part of the folding roof and at the rear end is held on a rear roof component which is fixed to the vehicle. The tensioning cable is length-adjustable for adjusting the cable tension via a tensioning cable system. The tensioning cable system comprises a latching base fixedly anchored to the rear roof component, a latching element attached to the rear end of the tensioning cable, and a latching mechanism which is adjustable in multiple stages and disposed between the latching base and the latching element for adjusting the longitudinal position of latching element relative to the latching base only in the longitudinal direction. The latching element in the adjusted position is held so as to be latched in a form-fitting manner to the latching base.

9 Claims, 3 Drawing Sheets

(56) References Cited

FOREIGN PATENT DOCUMENTS

EP          4129106 A1  *  2/2023   ............... A43C 1/00
GB           340183 A      12/1930

* cited by examiner

VEHICLE ROOF HAVING AN OPENABLE FOLDING ROOF WITH A TENSIONING CABLE SYSTEM

CROSS-REFERENCE TO RELATED APPLICATIONS

This application claims priority to German Patent Application No. DE 102022211317.9 filed on Oct. 25, 2022. The entire disclosure of the above application is incorporated herein by reference.

FIELD OF THE INVENTION

The invention relates to a vehicle roof having an openable folding roof equipped with a tensioning cable system.

BACKGROUND OF THE INVENTION

This section provides information related to the present disclosure which is not necessarily prior art.

Motor vehicles with vehicle roofs of the type having an openable folding roof may contain tensioning cables which, in the closed roof position, on the lateral peripheral regions of the folding roof that run in the longitudinal direction of the motor vehicle, exert tension on a topcover and in this way achieve sealing in relation to the vehicle bodywork in the roof region. For this purpose, the tensioning cables are disposed in lateral pockets of the topcover and are fixedly attached at the ends to the bodywork on a front roof part and on a rear roof part.

An embodiment of a tensioning cable system with a fixed tensioning cable length leads to low closing forces; however, the length of the tensioning cable has to be very precisely adapted because is it not possible for the cable tension to be subsequently adjusted and thus adapted.

DE 37 23 598 C2 describes a vehicle roof for a motor vehicle, which is embodied as a folding sunroof and has a plurality of bows which are length-adjustable in lateral roof guides and support a topcover fabric. In order for the folding sunroof to be opened, the bows—including a roof cowl at the front to which the topcover fabric is fastened—are displaced rearward in the lateral guides, as a result of which the topcover fabric forms creases. For achieving a defined crease pattern and for tensioning the topcover fabric in the closed roof position, a tensioning cable is in each case guided through the topcover fabric in the region of the left and the right side of the roof, said tensioning cable being impinged with a force by a spring element so as to generate a defined cable tension. The spring element is embodied as a coil spring which is disposed in the extension of the tensioning cable. The disadvantage of a tensioning cable system with a spring element lies in the reduction of the overall stiffness of the complete system.

EP 2 572 913 B1 shows a folding roof with a tensioning cable system, an end region of the tensioning cable being held on a component fixed to the bodywork so as to be impinged with a force by a tension spring. The tensioning cable system furthermore comprises a tensioning lever for adjusting the tension force, and a detent which limits the adjustment of the tensioning lever.

A vehicle having an openable cover embodied as a tarpaulin is known from GB 340,183 A. The peripheries of the tarpaulin are embodied in such a manner that they accommodate a tensioning cable, as a result of which it is guaranteed that the tarpaulin in the closed state bears in a sealing manner on the encircling roof peripheries. One end of the tensioning cable is attached to a first end of the roof, so as to be fixed to the bodywork, the other end is able to be established on the opposite end of the roof by means of a lever mechanism. Any length variation in the cable can be compensated for by way of the lever mechanism. For this purpose, the tensioning cable is attached to a displaceable lever of the lever mechanism. The lever has a crosspin. A latching fitting, which is embodied with hook-shaped latching elements bent upward for receiving the pin in a latching manner, is disposed on the end of the roof.

SUMMARY OF THE INVENTION

This section provides a general summary of the disclosure and is not a comprehensive disclosure of its full scope or all of its features.

It is an object of the invention to configure a vehicle roof with an openable folding roof by way of simple constructive measures in such a way that the folding roof can be variably tensioned in the closed state, and whereby the issue of tolerances in terms of the tensioning cable length can be adjusted and simply compensated at any time.

This object is achieved according to the invention by a vehicle roof having an openable folding roof and a tensioning cable which tensions the folding roof in the closed state. The tensioning cable is fixedly anchored at a front end to a front roof part of the folding roof and is held at a rear end on a rear roof component which is fixed to a body portion of the vehicle. The tensioning cable is length-adjustable for adjusting the cable tension by means of a tensioning cable system. The tensioning cable system comprises a latching base which is fixedly anchored to the rear roof component, a latching element, and a latching mechanism. The rear end of the tensioning cable is fixedly anchored to the latching element. The latching mechanism is disposed between the latching base and the latching element in the longitudinal direction in such a manner that the position of the latching element is adjustable relative to the latching base. The latching element, when located in an adjusted position, is held so as to be latched in a form-fitting manner to the latching base. The latching element is adjustable relative to the latching base only in one longitudinal direction, wherein this longitudinal direction is the vehicle longitudinal direction, and wherein the latching element is adjustable relative to the latching base only in the vehicle longitudinal direction toward the rear. The latching mechanism is adjustable in multiple stages via engagement between a latching toothing formed on the latching element and corresponding flexible tongues formed on the latching base. The latching element, preferably as a plastic injection-molded part, is embodied as a cuboid base element configured with mutually-opposite lateral edge surfaces which run in the longitudinal direction, upper and lower surfaces, and lateral end surfaces which run in the transverse direction, and wherein the latching toothing is configured on both of the laterally-spaced edge surfaces. The latching base has a cuboid main body with a continuous square hole running in the longitudinal direction which is configured for receiving the latching element therein. The main body preferably is embodied as a plastic injection-molded part having the flexible tongues, that are adapted to communicate with the latching toothing, with the flexible tongues extending inwardly from two mutually-opposite lateral walls of the square hole and running in the longitudinal direction.

In order to variably tension the folding roof in the closed state, whereby the issue of tolerances in terms of the tensioning cable length can be adjusted and simply compensated at any time, according to the invention the position of the latching element is adjustable relative to the latching base which is fixedly attached to the body portion of the vehicle only in one longitudinal direction. The longitudinal direction herein is the vehicle longitudinal direction. The latching base and the latching element herein are embodied so as to be mutually adjustable in such a manner that the latching element in relation to the latching base is only adjustable in the longitudinal direction toward the rear, and that the adjustment is provided via a latching mechanism which is adjustable in multiple stages and is formed by a latching toothing on the latching element and corresponding flexible tongues on the latching base.

The adjustment only in the longitudinal direction toward the rear corresponds exclusively to a displacement movement, the latching element being disposed so as to be displaceable relative to the latching base in the longitudinal direction toward the rear.

The vehicle roof has an adjustable folding roof which is adjustable between a closed position, in which an opening in the vehicle roof is covered, and an opened position, in which the opening is exposed. For example, the folding roof is embodied as a folding sunroof which for conversion between the closed position and the opened position carries out a displacement movement along the vehicle longitudinal axis. For this purpose, lateral guide rails, which lie on top and are fixedly held on the coachwork or the bodywork, can be provided in the vehicle roof, wherein the lateral guide rails delimit the opening therebetween, and the folding sunroof is displaceable along the longitudinal axis in the lateral guide rails.

The folding roof has a topcover fabric and linkage parts, the latter being supports of the topcover fabric. For conversion between the closed position and the opened position, the linkage parts—including the topcover fabric—are adjusted. In the case of a folding sunroof, the linkage parts comprise a front roof part and one or a plurality of roof bows lying which lie behind the latter and between the lateral guide rails extend in the vehicle transverse direction and are coupled to the topcover fabric.

The roof bows are comprised of a front roof bow, one or a plurality of central roof bows, and a rear roof bow.

The front roof part of the linkage parts forms a roof cowl to which the topcover fabric is attached. In the case of an opened vehicle roof, the topcover fabric forms creases.

In order to tension the topcover fabric in the closed state of the folding roof, a tensioning cable which is connected to the topcover fabric of the folding roof is provided. Advantageously, one tensioning cable is, in each case, situated in the region of the left and the right side of the roof and runs in the vehicle longitudinal direction, with each tensioning cable being connected to the topcover fabric.

The tensioning cable extends in particular between the front roof cowl of the folding roof and a rear roof part which is fixed to the coachwork or body portion f the vehicle, the folding roof bearing on the rear roof part in the opened state.

According to the invention, in an assembled arrangement of the folding roof, the tensioning cable is adjustable in a force-controlled manner by means of the tensioning cable system. This circumvents the problem of tolerances in the case of a fixed tensioning cable length.

The latching element is configured so as to be adjustable in relation to the latching base, so as to be able to exactly adjust the tension in the tensioning cable in the case of a closed vehicle roof. The latching element in the adjusted relative position is held in a form-fitting manner on the latching base. This form-fitting latching mechanism can only be cancelled by introducing a tensile force into the end of the tensioning cable attached to the latching element, as a result of which an increase in the cable tension takes places by adjusting the latching element relative to the latching base in the longitudinal direction toward the rear. In this adjusted position, the latching element latches in a form-fitting manner to the latching base.

A precise adjustment of the tensioning cable length can advantageously take place by way of a tight latching pitch.

The rear roof part, which is fixed to the bodywork, is advantageously implemented by way of a rear roof bow with a cutout in the contour. As a result, the function of the tensioning cable can be implemented during the automated adhesive bonding of a folded edge of the cover fabric.

The tensioning cable is advantageously guided in a sealing groove which extends in the vehicle longitudinal direction and is held on the lateral guide rails in which the kinematic components of the folding roof are displaceably guided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected non-limiting embodiments and are not intended to limit the scope of the present disclosure.

DESCRIPTION OF THE INVENTION

Identical components are provided with the same reference signs in the figures.

Figure 1:
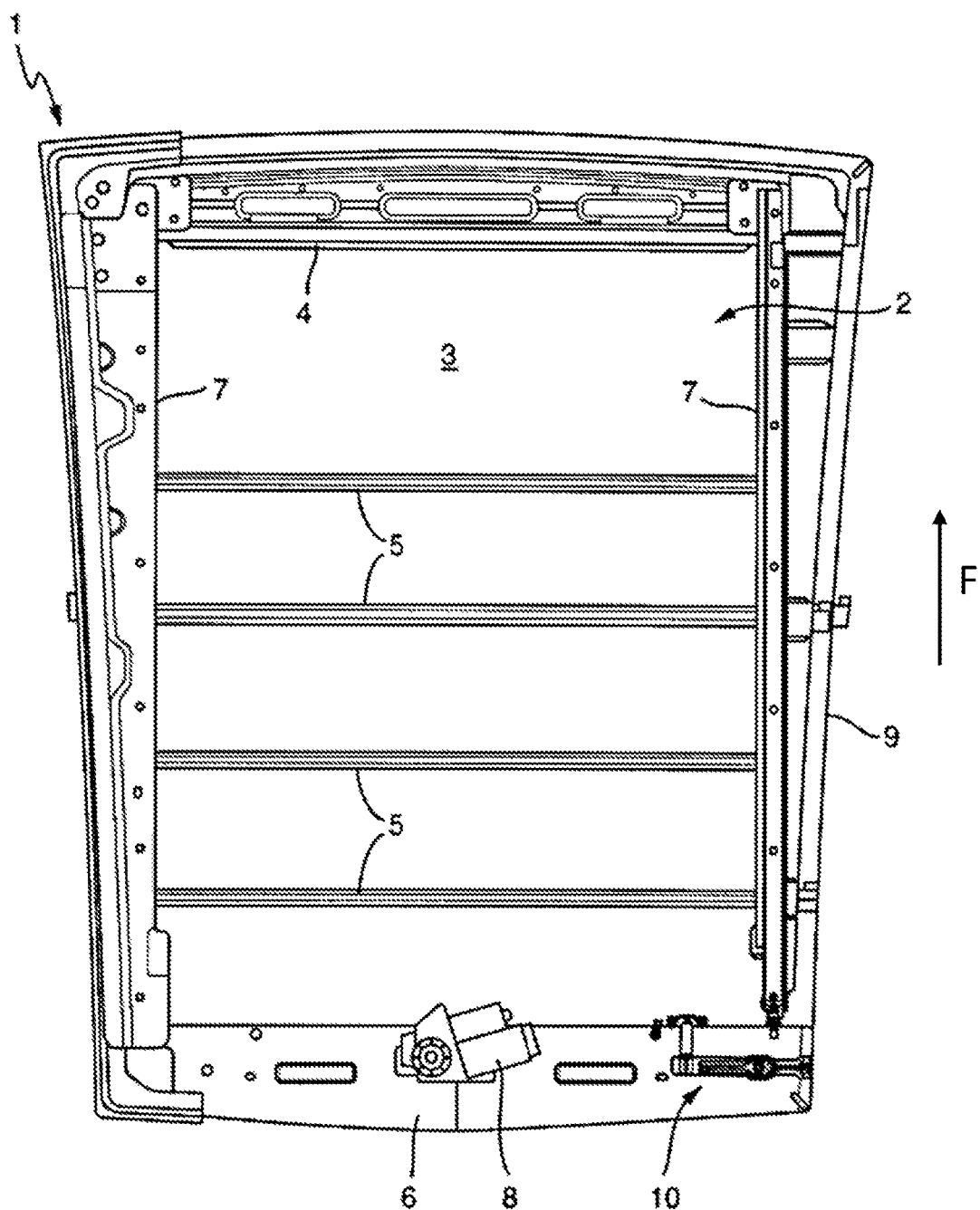
FIG. 1 shows a view from below of a vehicle roof having an openable folding roof, illustrated in the closed state.

FIG. 1 shows, in a view from below, a vehicle roof 1 having an adjustable folding roof 2 which comprises a topcover fabric 3 as well as a plurality of linkage parts 4, 5 which support the topcover fabric 3. The linkage parts include a front roof cowl 4, which on the front in the vehicle longitudinal direction, in the closed state of the roof 1, bears on a front roof frame 7a. The linkage parts also include a plurality of roof bows 5 which extend in the transverse direction and are disposed between the front roof cowl 4 and a rear roof part 6 which is disposed so as to be fixed, or immovable, on the coachwork or a body portion of the vehicle. The front roof cowl 4 and the roof bows 5 are guided in a pair of lateral guide rails 7 on the coachwork, and can be displaced toward the rear or toward the front in the vehicle longitudinal direction in the guide rails 7 so as to carry out the closing or opening procedure, respectively.

The adjustment movement of the folding roof 2 is performed by means of a drive installation 8 which includes an electric motor. In order to open the folding roof 2, which is embodied as a folding sunroof, the linkage parts 4, 5—by activating the drive installation 8—are adjusted in the lateral guide rails 7 toward the rear in the direction of a rear roof part 6. The topcover fabric 3 is held on the linkage parts 4, 5 and forms creases during the opening procedure.

In the closed state of the folding roof 2, the topcover fabric 3 is taut because the topcover fabric is fastened to the front roof cowl 4, which in the case of a closed roof has the maximum spacing from the rear roof part 6 to which the opposite end of the topcover fabric 3 is fastened, on the one hand. On the other hand, a tensioning cable 9, which on the lateral peripheries 3a, is connected to the topcover fabric 3 and additionally impinges the latter with tension in the case of a closed roof, is in each case guided in the lateral region of the roof. The tensioning cable 9 runs in each case along the lateral guide rails 7 and is in each case advantageously guided in a sealing groove which is disposed on the guide rails 7. The tensioning cable 9 is tensioned by a tensioning cable system 10, which is illustrated in detail in the further figures.

For the sake of simplicity, only the tensioning cable system 10 on one side of the folding roof 2 is described hereunder. The opposite side of the folding roof 2 is understood to be embodied with the analogous tensioning cable system.

In order for the lateral periphery to bear in a sealing manner in the closed position, the tensioning cable 9, by way of the front end thereof, is established so as to be fixedly anchored to the front roof cowl 4. In order to adjust the tensioning cable 9 in a force-controlled manner, the latter at the rear end thereof is attached by means of the tensioning cable system 10. The tensioning cable system 10 is held indirectly or directly on a rear component—fixed to the bodywork—of the vehicle roof 1.

In the exemplary embodiment shown, the rear component which is fixed to the body of the vehicle is the last or rear roof bow 5 disposed in the rear region of the roof. In the view from below of FIG. 1, the rear roof bow 5 is obscured by the rear roof part 6 and is not visible.

In FIG. 1, the direction of travel is denoted by the arrow F. The front side is denoted by V, and the rear side, or the rear, is denoted by H.

Figure 2:
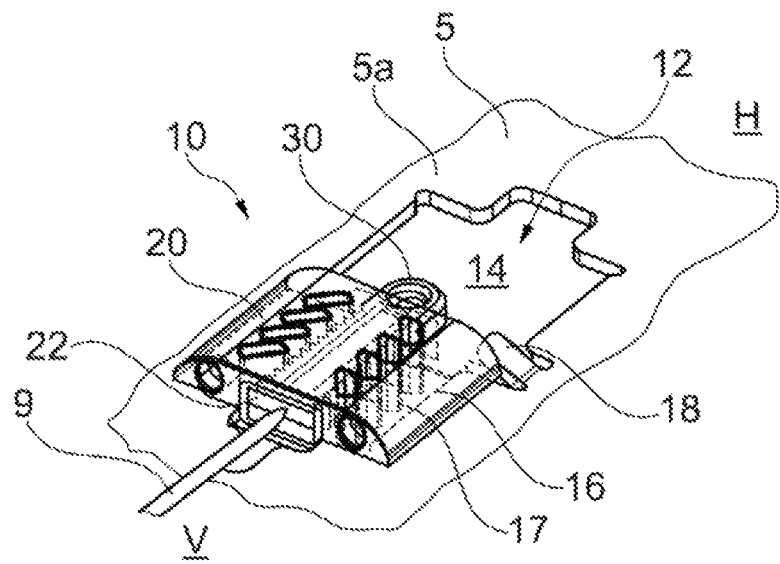
FIG. 2 shows a perspective three-dimensional view of a tensioning cable system including a tensioning cable for tensioning a topcover fabric of the folding roof, a component fixed to the bodywork, a latching base, a latching element and a latching mechanism.
Figure 5:
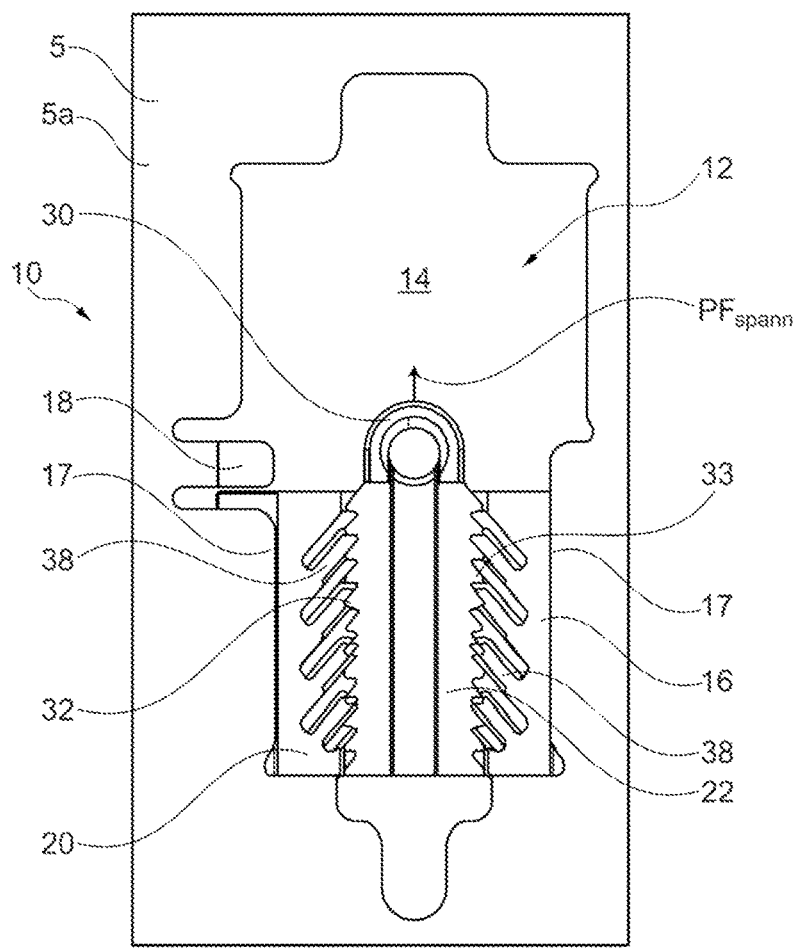
FIG. 5 shows a view of the tensioning cable system in the assembled situation without the tensioning cable.

The rear roof bow 5 is only shown in a fragment in FIGS. 2 and 5. The fragment shows a lateral end region 5a of the rear roof bow 5. A rectangular cutout, shown as a punchout 12, is incorporated in the lateral end region 5a of the rear roof bow 5. The rectangular cutout 12 comprises a first region 14 with an enlarged width B1, and a second region 16 which adjoins said first region 14, when viewed in the longitudinal direction, and has lateral, mutually-opposite guide strips 17. A locking tab 18, which during assembling can be bent to a locking position as will be explained in more detail hereunder, is configured between the first region 14 and the second region 16. The upward-bent locking position of the locking tab 18 is shown in FIG. 2.

Figure 3:
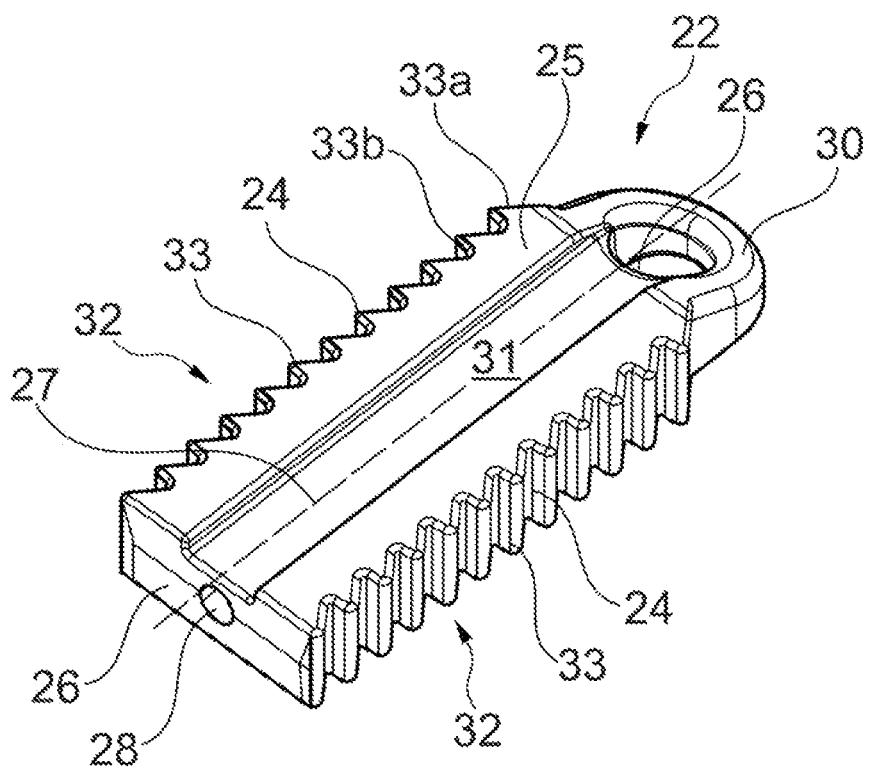
FIG. 3 shows a perspective three-dimensional view of the latching element as an individual part.

The tensioning cable system 10 further comprises a latching base 20 and a latching element 22. The latching element 22 is best shown in FIG. 3 embodied as an elongate cuboid base element. This base element is a plastic injection-molded part. The latching element 22 has mutually opposite lateral edge surfaces 24 which run in the longitudinal direction, as well as an upper surface 25 and a lower surface (nor shown), as well as a pair of lateral end surfaces 26 which run in the transverse direction. The longitudinal axis is denoted by the line 27. In the longitudinal direction, a continuous bore 28 is configured so as to be approximately centric in the main body. An integrally molded eyelet 30 is configured on the main body at the rear lateral end surface 26 that runs in the transverse direction in the installed position. A continuous guide groove 31 running in the longitudinal direction is incorporated on the upper surface 25 of the main body.

As can furthermore be seen from the illustration of FIG. 3, the lateral edge surfaces 24 running in the longitudinal direction are each embodied with a latching toothing 32. The latching toothing 32 comprises a multiplicity of obliquely running latching teeth 33 which, when viewed in the longitudinal direction, have in each case an obliquely running tooth flank 33a which is oriented toward the front, and a tooth flank 33b which runs substantially in the transverse direction. The opposite lateral latching toothing 32 thus form a structure in the manner of a fir tree.

The cable-tensioning system 10 furthermore comprises the latching base 20 which is fixedly held on the component 5, which is fixed to the body of the vehicle, so that a relative movement between the component 5, which is fixed to the bodywork, and the latching base 20 is impossible in the assembled situation.

Figure 4:
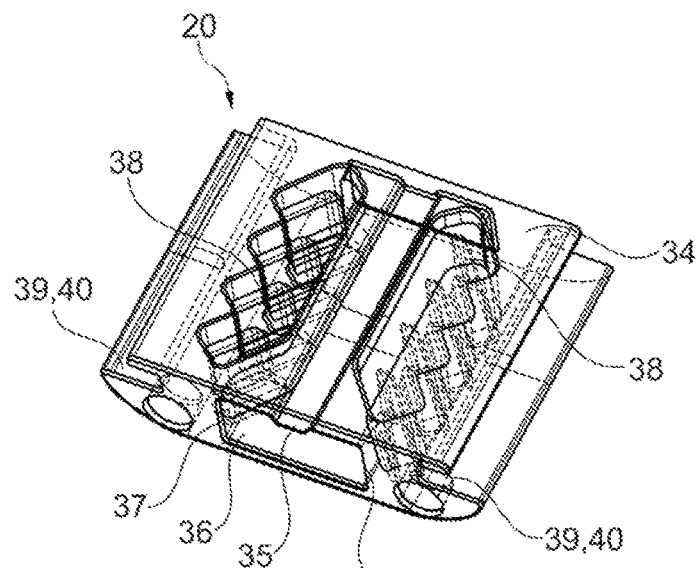
FIG. 4 shows a perspective three-dimensional view of the latching base as an individual part.

As best shown in FIG. 4, the latching base 20 has a cuboid main body 34 which, for receiving the latching element 22, comprises a continuous square hole 36 running in the longitudinal direction. The main body 34 is likewise embodied as a plastic injection-molded part. Obliquely running flexible tongues 38, which are adapted to communicate with and engage the obliquely running latching teeth 33 of the latching element 22, are configured on two mutually opposite lateral walls 37 of the square hole 36. In the assembled situation, the flexible tongues 38 engage with the latching teeth 33 of the latching element 22. Accordingly, when viewed in the longitudinal direction in the assembled state, a respective one of the latching teeth 33 alternates with a respective one of the flexible tongues 38. Owing to the oblique configuration of the latching teeth 33 and the flexible tongues 38, a relative movement between the latching element 22 and the latching base 20 is possible only in one direction. This direction of movement is indicated by the arrow PFspann in FIG. 5.

Owing to the pitch of the latching teeth 33 and the pitch of the flexible tongues 38, and owing to the engagement of the latching teeth 33 disposed on both sides of edge surfaces 24 with the corresponding flexible tongues 38 configured on the lateral walls 37, during a relative movement two mutually opposite flexible tongues come to engage every 0.4 mm as a result of the offset in the pitch.

As can furthermore be seen from the latching base 20, illustrated as an individual part in FIG. 4, a guide web 35 which is configured to communicate with the guide groove 31 of the latching element 22 is integrally molded in the region of the square hole 36, so as to be centric, running in the longitudinal direction, on the upper delimitation wall of the square hole 36. Furthermore, the lateral regions 39 of the main body 34, which run in the longitudinal direction, are embodied with continuous guide grooves 40. The guide grooves 40 are configured in a manner corresponding to the guide strips 17 of the element 5 which is fixed to the body portion of the vehicle.

FIGS. 2 and 5 show the assembled situation of the tensioning cable system 10.

The latching element 22 is first inserted into the square hole 36 of the latching base 20. The guide groove 31 of the latching element 22, which is introduced into the guide web 35 of the latching base 20, serves as an insertion aid. As has already been explained above, this is only possible in one direction. The latching toothing 32 of the latching element 22 herein engages in a form-fitting manner in the latching tongues 38 of the latching base 20. The combination of the latching toothing 32 on the latching element 22 and the latching tongues 38 on the latching base 20 function to define a multiple-stage latching mechanism.

Furthermore, in the assembled situation, the latching base 20 is held so as to be inserted and locked in the rear link element 5, which is fixed to the bodywork. When assembling the latching base 20, the cuboid main body is inserted into the first region 14 of the clearance, and by means of the lateral guide grooves 40 of the cuboid main body pushed into the corresponding guide grooves 17. In this assembled position, the locking tab 18 is co-aligned with the guide strips 17 so that it is possible to insert the latching base 20. In the inserted position, the locking tab 18 is then bent upward in the vertical direction so that the main body is no longer displaceable relative to the component 5, which is fixed to the bodywork (locking position).

Once the latching base 20 and the latching element 22 have been assembled, the tensioning cable 9 is finally guided through the bore 28 from the front to the rear and, by way of the rear end region of the tensioning cable 9, is fixed to the eyelet 30 overmolded on the main body. The assembled situation, without the fixing of the tensioning cable 9 on the eyelet, is shown in FIG. 2.

The desired cable tension is initially pre-adjusted when fixing the tensioning cable 9. A final adjustment of the cable tension is performed in a force-controlled manner on the completely assembled folding roof 2. For this purpose, the rear end of the tensioning cable 9 fixed to the eyelet 30 is guided toward the outside, by way of the lateral regions of the folding roof that run in the longitudinal direction, and a defined tensile force is introduced. As a result of this introduction of force, the latching element 22 is displaced in the latching base 20 according to the latching pitch. Once the desired cable tension has been reached, the latching toothing 32 on the latching element 22 latch in a form-fitting manner in the latching base 20, whereby the latching teeth 33 come to bear on the flexible tongues 38 in an alternating manner.

Owing to the fine latching pitch of the latching toothing 32, a precise adjustment of the cable tension, as well as a subsequent adaptation of the cable tension, can be easily performed without any further tools.

What is claimed is:

1. A vehicle roof having an openable folding roof and a tensioning cable which tensions the folding roof in a closed state, a front end of the tensioning cable being fixedly anchored to a front roof part of the folding roof and a rear end of the tensioning cable being held on a rear roof component of the folding roof which is fixed to a body portion of a motor vehicle, the tensioning cable being length-adjustable for adjusting the cable tension via a tensioning cable system, the tensioning cable system comprising a latching base which is fixedly anchored to the rear roof component, a latching element fixedly anchored to the rear end of the tensioning cable, and a latching mechanism disposed between the latching base and the latching element for adjusting the position of the latching element relative to the latching base such that the latching element is latched to the latching base in an adjusted position, wherein the adjusted position of the latching element is adjustable relative to the latching base in only the vehicle longitudinal direction toward the rear, wherein the latching mechanism includes a latching toothing on the latching element and corresponding flexible tongues on the latching base, wherein the latching element includes a base element with mutually-opposite lateral edge surfaces which run in the longitudinal direction and from which the latching toothing extends, wherein the latching base includes a main body with a continuous square hole running in the longitudinal direction which is configured for receiving the latching element therein, and wherein the flexible tongues extend from two mutually-opposite lateral side walls of the square hole and are configured to engage the corresponding latching toothing to latch the latching element in the adjusted position relative to the latching base.

2. The vehicle roof as claimed in claim 1, wherein the latched engagement between the latching element and the latching base is designed in such a manner that the latched engagement is able to be cancelled only by way of a tensile force acting on the tensioning cable, and a relative movement in the longitudinal direction between the latching element and the latching base for adjusting the tensioning cable length and increasing the cable tension is able to be effected by way of the tensile force, and the latching element in the adjusted relative position is able to be latched in a form-fitting manner to the latching base.

3. The vehicle roof as claimed in claim 1, wherein the folding roof comprises a multiplicity of linkage parts including a front roof cowl and a plurality of roof bows extending in the transverse direction, and wherein the component which is fixed to the body of the vehicle is a rear roof bow.

4. The vehicle roof as claimed in claim 3, wherein the rear roof bow at the end side, for fixedly mounting the latching base to the body of the vehicle, is embodied with a punch-out and at least one locking tab, the locking tab being adjustable to an assembling position and a locking position.

5. The vehicle roof as claimed in claim 1, wherein the latching toothing comprises a multiplicity of obliquely running latching teeth which, when viewed in the longitudinal direction, have in each case an obliquely running tooth flank which is oriented toward the front, and a tooth flank which runs substantially in the transverse direction.

6. The vehicle roof as claimed in claim 1, wherein the latching element has a continuous bore in the longitudinal direction, which is centric.

7. The vehicle roof as claimed in claim 1, wherein an eyelet for attaching the tensioning cable is disposed on the main body of the latching element.

8. The vehicle roof as claimed in claim 1, wherein the latching base has a guide web which acts as an insertion aid and communicates with a guide groove formed in the latching element.

9. The vehicle roof as claimed in claim 1, wherein the tensioning cable in an assembled arrangement with the latching element extends through a guide hole formed through the main body and has its rear end fixed to an eyelet.

* * * * *